US012614305B2

(12) United States Patent
Cheng et al.

(10) Patent No.:  US 12,614,305 B2
(45) Date of Patent:  Apr. 28, 2026

(54) TARGET OBJECT DETECTION METHOD AND APPARATUS, AND ELECTRONIC DEVICE, STORAGE MEDIUM AND PROGRAM

(71) Applicant: BEIJING JINGDONG QIANSHI TECHNOLOGY CO., LTD., Beijing (CN)

(72) Inventors: Yunjian Cheng, Beijing (CN); Weifeng Liu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 341 days.

(21) Appl. No.: 18/248,617

(22) PCT Filed: Jan. 13, 2022

(86) PCT No.: PCT/CN2022/071867
§ 371 (c)(1),
(2) Date: Apr. 11, 2023

(87) PCT Pub. No.: WO2022/156593
PCT Pub. Date: Jul. 28, 2022

(65) Prior Publication Data
US 2023/0410362 A1     Dec. 21, 2023

(30) Foreign Application Priority Data

Jan. 20, 2021    (CN) .......................... 202110077817.9

(51) Int. Cl.
*G06T 7/73*         (2017.01)
*G06T 7/246*      (2017.01)
(Continued)

(52) U.S. Cl.
CPC ................ *G06T 7/74* (2017.01); *G06T 7/248* (2017.01); *G06T 7/60* (2013.01); *G06V 20/50* (2022.01); *G06V 20/70* (2022.01)

(58) Field of Classification Search
CPC .. G06T 7/74; G06T 7/248; G06T 7/60; G06V 20/70; G06V 20/50
See application file for complete search history.

(56) References Cited

U.S. PATENT DOCUMENTS 9,142,035 B1 *   9/2015   Rotman ........... G07B 17/00661
10,456,915 B1   10/2019   Diankov
(Continued)

FOREIGN PATENT DOCUMENTS

CA        3078850 A1 *   5/2019   ............... G06T 7/11
CN        108116058 A   6/2018
(Continued)

OTHER PUBLICATIONS

Supplementary European Search Report in the European application No. 22742072.6, mailed on Apr. 15, 2024. 7 pages.
(Continued)

*Primary Examiner* — Pinalben Patel
(74) *Attorney, Agent, or Firm* — Cooper Legal Group, LLC

(57)                ABSTRACT

Provided in the embodiments of the present application are a target object detection method and apparatus, and an electronic device and a computer storage medium. The method comprises: when it is determined that a robot arm picks up a target object from any turnover box and the height of the target object is greater than the height of the turnover box, performing target tracking on the target object to obtain real-time position information of the target object; and when it is determined, according to the real-time position information of the target object, that the target object falls from (Continued)

the robot arm, determining an area in which the target object is located according to position information of the target object at the current moment and area position information, wherein the area position information comprises areas in which various types of turnover boxes are located.

18 Claims, 6 Drawing Sheets

(51) Int. Cl.

| | | |
|---|---|---|
| *G06T 7/60* | (2017.01) | |
| *G06V 20/50* | (2022.01) | |
| *G06V 20/70* | (2022.01) | |

(56) References Cited

U.S. PATENT DOCUMENTS

| | | | |
|---|---|---|---|
| 10,569,416 B1 | 2/2020 | Diankov | |
| 10,569,417 B1 | 2/2020 | Diankov | |
| 10,576,631 B1 | 3/2020 | Diankov | |
| 10,596,701 B1 | 3/2020 | Diankov | |
| 10,766,141 B1 | 9/2020 | Diankov | |
| 11,373,329 B2 * | 6/2022 | Jeong | G06T 7/73 |
| 2017/0248971 A1 | 8/2017 | Wei | |
| 2020/0156254 A1 * | 5/2020 | Li | G06V 30/248 |
| 2020/0238517 A1 | 7/2020 | Diankov | |
| 2020/0361091 A1 | 11/2020 | Diankov | |
| 2021/0146533 A1 | 5/2021 | Diankov | |
| 2024/0153138 A1 * | 5/2024 | Li | G06V 10/761 |

FOREIGN PATENT DOCUMENTS

| | | |
|---|---|---|
| CN | 109087328 A | 12/2018 |
| CN | 110420445 A | 11/2019 |
| CN | 110813784 A | 2/2020 |
| CN | 111185396 A | 5/2020 |
| CN | 112091970 A | 12/2020 |
| CN | 113744305 A | 12/2021 |
| JP | 2020094820 A | 6/2020 |
| WO | 2020244592 A1 | 12/2020 |

OTHER PUBLICATIONS

Qian Chenghui et al., "Design of Garbage Sorting Robot Based on Machine Vision", Microcontrollers & Embedded Systems, No. 9 of 2019, Dec. 31, 2019, the whole document. 4 pages with English abstract.

Chen Zhihong et al., "A Vision-based Robotic Grasping System Using Deep Learning for Garbage Sorting", 2017 36th Chinese Control Conference (CCC), DOI:10.23919/chicc.2017.8029147, Jul. 26-28, 2017, the whole document. 4 pages.

International Search Report in the international application No. PCT/CN2022/071867, mailed on Apr. 13, 2022. 3 pages.

English translation of the Written Opinion of the International Search Authority in the international application No. PCT/CN2022/071867, mailed on Apr. 13, 2022. 4 pages.

* cited by examiner

FIG. 2B

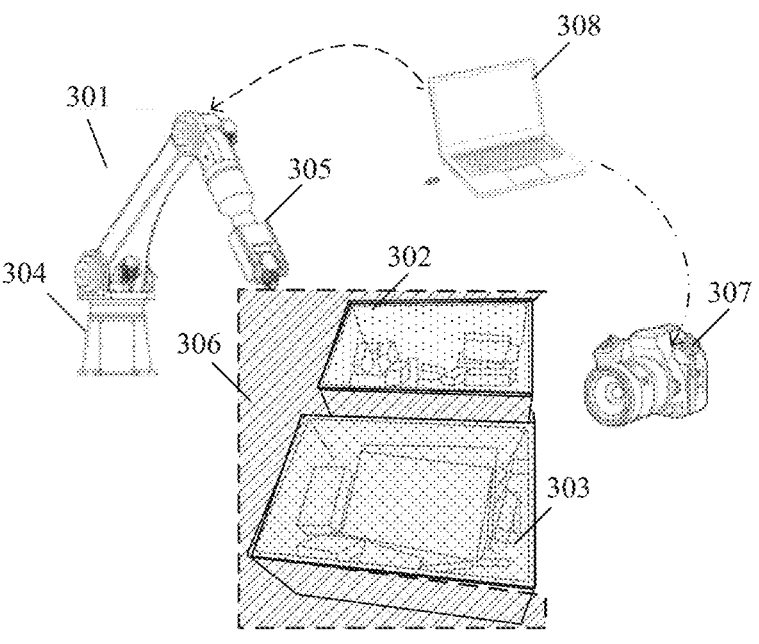

FIG. 3

| In response to determining that a mechanical arm picks up a target object from any one of a plurality of turnover boxes and a height of the target object is greater than a height of the turnover box, performing target tracking on the target object to obtain real-time position information of the target object | 401 |
|---|---|

| In response to determining, based on the real-time position information of the target object, that the target object falls down from the mechanical arm, determining an area where a landing point of the target object is located based on position information of the target object at current time and area position information | 402 |
|---|---|

Issue a sorting task

No

702

Is a sorting preparation work completed?

Yes

703

Obtaining areas where various types of turnover boxes are located

704

Sending back to WCS for confirmation

No

705

Is information of a source turnover box and a destination turnover box correct?

Yes          601

Determining that a sorting process is started

801

First processing module

802

Second processing module

TARGET OBJECT DETECTION METHOD AND APPARATUS, AND ELECTRONIC DEVICE, STORAGE MEDIUM AND PROGRAM

CROSS-REFERENCE TO RELATED APPLICATION

This application is based upon and claims priority to Chinese patent application No. 202110077817.9 filed on Jan. 20, 2021 and entitled "TARGET OBJECT DETECTION METHOD AND APPARATUS, AND ELECTRONIC DEVICE, STORAGE MEDIUM", the disclosure of which is hereby incorporated by reference in its entirety.

TECHNICAL FIELD

The present disclosure relates to a target detection technology, and relates to, but is not limited to, a method and apparatus for target object detection, an electronic device, a computer storage medium and a computer program.

BACKGROUND

In related arts, for an object sorting process, a landing point of an object can be estimated by using a detection method based on photoelectric sensors, a vision-based object detection method or a detection method based on a motion model.

SUMMARY

Embodiments of the present disclosure are expected to provide a method and an apparatus for target object detection, an electronic device, a computer storage medium and a computer.

An embodiment of the present disclosure provides a method for target object detection, which includes the following operations.

When it is determined that a mechanical arm picks up a target object from any one of multiple turnover boxes and a height of the target object is greater than a height of the turnover box, target tracking is performed on the target object to obtain real-time position information of the target object.

When it is determined, based on the real-time position information of the target object, that the target object falls down from the mechanical arm, an area where a landing point of the target object is located is determined based on position information of the target object at current time and area position information. The area position information includes areas where various types of turnover boxes are located.

In some embodiments of the present disclosure, the method further includes the following operations.

For each turnover box of multiple turnover boxes, a type of the turnover box is determined based on an attribute of the turnover box; and type labeling information of the turnover box is obtained based on the type of the turnover box. The area position information is obtained based on type labeling information of all of the multiple turnover boxes.

In some embodiments of the present disclosure, the attribute of the turnover box includes at least one of: color, texture, shape, or size.

In some embodiments of the present disclosure, performing the target tracking on the target object includes the following operations.

The target object is captured for multiple times by using an image capturing device, to obtain multiple captured images; and the target tracking is performed on the target object based on each of the multiple captured images.

In some embodiments of the present disclosure, performing the target tracking on the target object based on each of the multiple captured images includes the following operations.

A background in each of the multiple captured images is eliminated to obtain a respective result after background elimination of the captured image; and the target tracking is performed on the target object based on the respective result after background elimination of the captured image. A background of the target object represents an image of a preset background object.

In some embodiments of the present disclosure, the method further includes the following operation.

After determining the area where the landing point of the target object is located, a position of the landing point of the target object is determined based on a relative position relationship between the image capturing device and the mechanical arm, and the position and attitude information of an end of the mechanical arm.

In some embodiments of the present disclosure, the method further includes the following operations.

After determining that the mechanical arm picks up the target object from the turnover box, an initial position of the target object is determined based on position and attitude information of an end of the mechanical arm; and the height of the target object is determined based on the initial position of the target object.

In some embodiments of the present disclosure, performing the target tracking on the target object includes the following operation.

The target tracking is performed on the target object based on the initial position of the target object, to obtain the real-time position information of the target object.

In some embodiments of the present disclosure, the method further includes the following operations.

When the area where the landing point of the target object is located is in a destination turnover box, it is determined that a sorting of the target object succeeds.

When the area where the landing point of the target object is located is in a source turnover box or another area, it is determined that the sorting of the target object fails. The another area is an area other than the destination turnover box and the source turnover box.

An embodiment of the present disclosure further provides an apparatus for target object detection, which includes a first processing module and a second processing module.

The first processing module is configured to: when it is determined that a mechanical arm picks up a target object from any one of multiple turnover boxes and a height of the target object is greater than a height of the turnover box, perform target tracking on the target object to obtain real-time position information of the target object.

The second processing module is configured to: when it is determined, based on the real-time position information of the target object, that the target object falls down from the mechanical arm, determine an area where a landing point of the target object is located based on position information of the target object at current time and area position information. The area position information includes areas where various types of turnover boxes are located.

In some embodiments of the present disclosure, the second processing module is further configured to perform the following operations.

For each turnover box of multiple turnover boxes, a type of the turnover box is determined based on an attribute of the turnover box, and type labeling information of the turnover box is obtained based on the type of the turnover box; and the area position information is obtained based on type labeling information of all of the multiple turnover boxes.

In some embodiments of the present disclosure, the attribute of the turnover box includes at least one of: color, texture, shape, or size.

In some embodiments of the present disclosure, during performing the target tracking on the target object, the first processing module is further configured to perform the following operations.

The target object is captured for multiple times by using an image capturing device to obtain multiple captured images; and the target tracking is performed on the target object based on each of the multiple captured images.

In some embodiments of the present disclosure, during performing the target tracking on the target object based on each of the plurality of captured images, the first processing module is further configured to perform the following operations.

A background in each of the multiple captured images is eliminated to obtain a respective result after background elimination of the captured image; and the target tracking is performed on the target object based on the respective result after background elimination of the captured image. A background of the target object represents an image of a preset background object.

In some embodiments of the present disclosure, the second processing module is further configured to perform the following operations.

After determining the area where the landing point of the target object is located, a position of the landing point of the target object is determined based on a relative position relationship between the image capturing device and the mechanical arm and position and attitude information of an end of the mechanical arm.

In some embodiments of the present disclosure, the first processing module is further configured to perform the following operations.

After determining that the mechanical arm picks up the target object from the turnover box, an initial position of the target object is determined based on position and attitude information of an end of the mechanical arm; and the height of the target object is determined based on the initial position of the target object.

In some embodiments of the present disclosure, during performing the target tracking on the target object, the first processing module is further configured to perform the following operations.

Based on the initial position of the target object, the target tracking is performed on the target object to obtain the real-time position information of the target object.

In some embodiments of the present disclosure, the second processing module is further configured to perform the following operations.

When the area where the landing point of the target object is located is in a destination turnover box, it is determined that a sorting of the target object succeeds.

When the area where the landing point of the target object is located is in a source turnover box or another area, it is determined that the sorting of the target object fails. The another area is an area other than the destination turnover box and the source turnover box.

An embodiment of the present disclosure further provides an electronic device, which includes a memory, a processor and a computer program stored on the memory and executable by the processor. The processor, when executing the program, performs any one of the method for target object detection.

An embodiment of the present disclosure further provides a computer storage medium having stored thereon a computer program. The computer program, when executed by a processor, causes the processor to perform any one of the methods for target object detection.

An embodiment of the present disclosure further provides a computer program product. The computer program product includes a non-transitory computer-readable storage medium having stored thereon a computer program, the computer program is executable to cause a computer to perform any one of the methods for target object detection in the embodiment of the present disclosure. The computer program product can be a software installation package.

It should be understood that the above general description and the following detailed description are exemplary and explanatory only and are not limiting to the present disclosure.

BRIEF DESCRIPTION OF THE DRAWINGS

The accompanying drawings, which are incorporated in and constitute a part of the description, illustrate embodiments consistent with the present disclosure and together with the description serve to explain technical solutions of the present disclosure.

FIG. 2B illustrates a diagram of an interior of a source turnover box in an embodiment of the present disclosure.

FIG. 3 illustrates a diagram of an application scenario of an embodiment of the present disclosure.

FIG. 4 illustrates an optional flowchart of a method for target object detection according to an embodiment of the present disclosure.

DETAILED DESCRIPTION

The present disclosure is described in further detail below with reference to the accompanying drawings and embodiments. It should be understood that the embodiments provided herein are intended to be explanatory only and are not intended to be limiting. In addition, the embodiments provided below are for implementing part of the present disclosure, not all of the embodiments, and the technical solutions described in the embodiments of the present disclosure can be implemented in any combination without conflict.

It should be noted that, in an embodiment of that present disclosure, the terms "include". "contain" or any other variation thereof are intended to encompass non-exclusive inclusion, so that a method or apparatus including a set of elements includes not only those explicitly documented but also other elements not explicitly listed, or also elements intrinsic to the implementation of the method or the apparatus. Without further limitation, an element defined by the statement "including a/an . . . " does not preclude the existence of another relevant element in the method or the apparatus that includes the element (e.g., an operation in the method or an element in the apparatus, such as a part of a circuit, a part of a processor, a part of a program or software, etc.).

The term "and/or" herein is merely an association relationship that describes associated objects, which means that there may be three relationships. For example "A and/or B" may have three meanings: A exists alone, A and C exist at the same time, and C exists alone. In addition, the term "at least one" herein means any one of the multiple or any combination of at least two of the multiple.

For example, a method for target object detection provided by an embodiment of the present disclosure includes a series of operations. However, the method for target object detection provided by the embodiment of the present disclosure is not limited to the described operations. Likewise, an apparatus for target object detection provided by an embodiment of the present disclosure includes a series of modules, but the apparatus for target object detection provided by the embodiment of the present disclosure is not limited to the modules explicitly recited in the embodiment of the present disclosure, and may also include modules required for obtaining relevant information or processing based on information.

In the related art, an object sorting process can be realized by using a detection method based on photoelectric sensors, a vision-based object detection method or a detection method based on a motion model, which are illustrated by the following examples.

1) Detection Method Based on Photoelectric Sensors

Figure 1A:
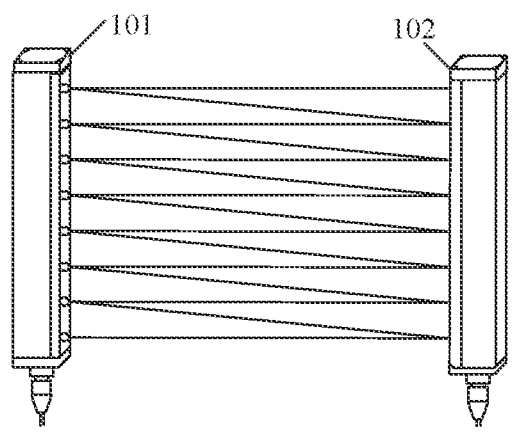
FIG. 1A illustrates a first diagram of detecting a falling area of a target object by using a grating sensor in an embodiment of the present disclosure.
Figure 1B:
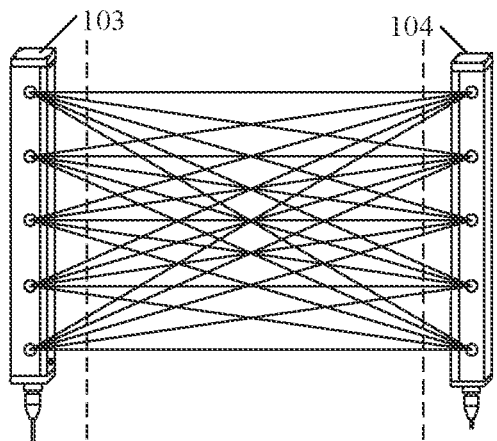
FIG. 1B illustrates a second diagram of detecting a falling area of a target object by using a grating sensor in an embodiment of the present disclosure.

In some embodiments, multiple detection sensors may be installed in a source turnover box, a destination turnover box, and an external area of turnover boxes. For example, the detection sensors may include a photoelectric through-beam sensor, a light curtain, or a grating sensor. With reference to FIG. 1A and FIG. 1B, a first transmitter 101 or a second transmitter 103 of the grating sensor is configured to transmit an optical signal. A first receiver 102 is configured to receive the optical signal transmitted by the first transmitter 101, and a second receiver 104 is configured to receive the optical signal transmitted by the second transmitter 103. An area between the first transmitter 101 and the first receiver 102 is a detection area, and an area between the second transmitter 103 and the second receiver 104 is a detection area. It is possible to determine whether a target object enters the detection area based on the optical signal received by the first receiver 102 or the second receiver 104. Then, in combination with states of the mechanical arm, it is possible to determine whether a target object falls down from a mechanical arm or even detect a falling area of the target object based on the optical signal received by the first receiver 102 or the second receiver 104.

2) Vision-Based Object Detection Method

Figure 2A:
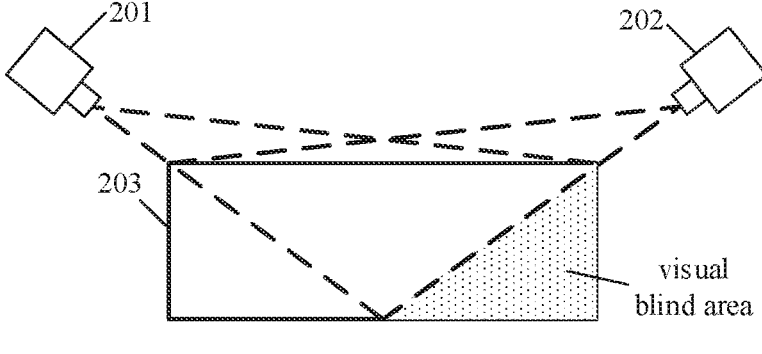
FIG. 2A illustrates a diagram of a principle of a vision-based object detection method in an embodiment of the present disclosure.

In some embodiments, an image of an interior of a turnover box can be captured by using a visual sensor, so as to determine whether a target object falls down from a mechanical arm by analyzing image data and combining with a sorting process of the mechanical arm. With reference to FIG. 2A, a first camera 201 and a second camera 202 are 3D cameras. The first camera 201 and the second camera 202 can be used to detect a Red Green Blue (RGB) image in the turnover box 203 and acquire depth information of objects in the image. Whether the target object falls down from the mechanical arm can be determined based on the depth information of the objects in the image and the sorting process of the mechanical arm.

In some embodiments, target tracking for objects is performed by using frame differences to calculate a motion area, then using feature matching and deep learning algorithms to perform detection and recognition; and finally, the target is tracked by using a target tracking method. For a scenario where the mechanical arm enters the box to pick items, as illustrated in FIG. 2B, there may be multiple identical target objects 204 in the source turnover box. For example, these target objects may be stock keeping units (SKU). Therefore, in such a scenario, it is difficult to guarantee the accuracy and precision of target object detection and recognition, thus affecting the subsequent target tracking accuracy.

3) Detection Method Based on a Motion Model

In some embodiments, a motion model of a mechanical arm system may be established to monitor in real time a pressure of an end pickup device (i.e., a device at the end of the mechanical arm for grasping objects) and a motion speed at the end of the mechanical arm. When a value of the pressure suddenly changes, it indicates that a picked target object has fallen from the end pickup device. At this time, a landing point of the target object is estimated based on the speed of the end of the mechanical arm, combined with the motion model of the mechanical arm.

All the above three methods can be used to detect an object fallen from the end pickup device, and detect or estimate, under specific conditions, a final position where the picked object has fallen down. However, all the above three solutions have some limitations and shortcomings, which will be explained below.

With reference to FIG. 1A and FIG. 1B, certain size restrictions are placed on the light curtain or the grating sensor, and the light is spaced, so there is a possibility of missing detection for small items. For example, in an area between the transmitter and the receiver, only 80% of the area is an effective detection area. It is necessary to perform partition management for all areas covered by a mechanical arm workstation so as to distinguish which area the target object falls in. In order to cover all the areas to be detected, the size of the grating sensor is large, which will affect a workspace of the mechanical arm. The grating sensor cannot detect the type of object entering the area, and therefore has an impact on the whole sorting process when other non-target objects enter.

The vision-based object detection method is costly and difficult to implement, and a visual blind area may exist, and there is a possibility of missing detection. For example, with reference to FIG. 2A, if only one camera B exists, there is a visual blind area as illustrated in the FIG. 2A. For the vision-based target detection method, whether a target area changes needs to be determined in real time, to determine whether the target object falls into the target area or not. In an implementation, firstly, all detected areas are required to be captured by visual sensors, and the environment (visual field of the visual sensors) is required to be unobstructed. Alternatively, occluded areas are reduced by increasing the number of the visual sensors. Because the visual field of the visual sensors is limited and there are visual blind areas, for each turnover box, at least two cameras are required to cover the whole area inside the turnover box, as illustrated in FIG. 2A. However, for areas outside the turnover box, more cameras are required to detect at the same time.

Furthermore, when using the vision-based target detection method, it is necessary to arrange as many and reasonable spatial positions of image sensors as possible, which can reduce the number and range of visual blind areas as much as possible. However, it is impossible to eliminate visual blind areas. When the detected object falls into visual blind areas, no visual sensors can capture the object, which leads to missing detection of the object and unreliable detection results.

When the detection method based on the motion model is used to estimate a falling area of the target object, the accuracy of the estimated results depends on the accuracy of the motion model. However, the more accurate the motion model is, the more parameters it depends on, and the more complex the system is. Furthermore, due to the existence of nonlinear factors, parts that cannot be modeled and random events, the motion model can only be a simulation of a real scene, and the motion model cannot be exactly the same as the real scene. The estimated result is only a result of probability and statistics, and thus the accurate landing point of every falling event cannot be obtained. In summary, the estimated results obtained from the detection method based on the motion model have a low reliability.

It can be seen that the detection method based on photo-electric sensors has the problem of missing detection, the vision-based target detection method has the problem of low detection accuracy and low reliability caused by the existence of visual blind areas, and the detection method based on the motion model has the problem of low reliability. To sum up, the solution of estimating the landing point of objects in the related arts has the problem of low reliability and low accuracy.

Regarding the above technical problems, a technical solution according to an embodiment of the present disclosure is proposed.

FIG. 3 illustrates a diagram of an application scenario of an embodiment of the present disclosure. As illustrated in FIG. 3, a mechanical arm 301 is used for picking up a target object from a source turnover box 302 and placing the target object into a destination turnover box 303. The mechanical arm includes at least a fixed base 304 and an end 305. The source turnover box 302 and the destination turnover box 303 are containers for storing items so as to facilitate the handling of items, the source turnover box 302 and the destination turnover box 303 represent two different types of turnover boxes, and other areas 306 represent out-of-box areas which exclude the source turnover box 302 and the destination turnover box 303.

In some embodiments, the target object may be a commodity or other type of an item which is not limited by the embodiments of the present disclosure.

In some embodiments, the mechanical arm may be a 6-degree-of-freedom mechanical arm and the end 305 may be provided with a clamp or sucker for picking up the target object.

In some embodiments, the number of source turnover boxes 302 may be one or more, and the number of destination turnover boxes 303 may be one or more, which are not limited in the embodiments of the present disclosure.

With reference to FIG. 3, an image capturing device 307 may also be deployed. The image capturing device 307 is a hardware device for capturing the source turnover box 302, the destination turnover box 303 and the other areas 306. In some embodiments, the image capturing device 307 may be a camera or other device. Exemplarily, the image capturing device 307 may be a consumer-grade camera.

In some embodiments, in order to achieve the detection of the target object in the sorting process, it is necessary to mark areas within a capturing range of the image capturing device 307, and model each area in a camera coordinate system. With reference to FIG. 3, an area within the capturing range of the image capturing device 307 may be divided into the source turnover box, the destination turnover box and other areas. In this way, when determining that the target object falls down from the mechanical arm, it can be determined whether the target object falls into the interior of the turnover box or the other areas. When determining that the target object falls into the interior of the turnover box, it can further detect whether it falls into the source turnover box or the destination turnover box. After determining the falling area of the target object, it is convenient to develop different response strategies of the mechanical arm based on the different falling areas.

In some embodiments, with reference to FIG. 3, a detection and control system 308 may also be configured. The detection and control system 308 may be connected to the mechanical arm 301 through a network, and the detection and control system 308 may transmit control signals to the mechanical arm 301 to control an operating state of the mechanical arm. The detection and control system 308 may also receive various types of feedback data transmitted by the mechanical arm 301.

The detection and control system 308 may form a communication connection with the image capturing device 307. Exemplarily, the detection and control system 308 may be connected to the image capturing device 307 via the network or USB connection. The detection and control system 308 and the image capturing device 307 can perform data interaction. Exemplarily, under the control of the detection and control system 308, the image capturing device 307 may track a target object picked up by the end 305 of the mechanical arm and determine the falling area of the target object. The image capturing device 307 may also return the captured image to the detection and control system 308.

In some embodiments, the detection and control system 308 and a master device (not illustrated in FIG. 3) may perform data interaction by using wired or wireless network communication to obtain instructions and transmit state data.

In some embodiments, detection and control software may be deployed in the detection and control system 308 to enable control of the operating states of the mechanical arm 301 and the image capturing device 307.

In some embodiments, the detection and control system 308 may be implemented based on a terminal and/or a server. The terminal may be a thin client, a thick client, a handheld or laptop device, a microprocessor-based system, a set-top box, a programmable consumer electronics product, a networked personal computer, a minicomputer system, and the like. The server can be a small computer system, a mainframe computer system, a distributed cloud computing technology environment including any of the above systems, etc.

An electronic device such as the server may be described in a general context of computer system executable instructions (such as program modules) executed by a computer system. Generally, the program modules can include routines, programs, object programs, components, logic, data structures, etc., which perform specific tasks or implement specific abstract data types. The computer system/server may be implemented in a distributed cloud computing environment in which tasks are performed by remote processing devices linked through a communication network. In a distributed cloud computing environment, the program modules may be located on a local or remote computing system storage medium that includes storage devices.

FIG. 4 illustrates an optional flowchart of a method for target object detection according to an embodiment of the present disclosure. As illustrated in FIG. 4, the flowchart may include the following operations.

At an operation 401, when it is determined that a mechanical arm picks up a target object from any one of multiple turnover boxes and a height of the target object is greater than a height of the turnover box, target tracking is performed on the target object to obtain real-time position information of the target object.

In an embodiment of the present disclosure, the turnover box can be a source turnover box. In some embodiments, the detection and control system may, after determining the start of the sorting process, transmit a control signal to the mechanical arm to cause the mechanical arm to pick up the target object from the turnover box through the end. The mechanical arm can control position and attitude of the end of the mechanical arm and generate its own working state data, which can include the position and attitude of the end of the mechanical arm. It should be understood that after the target object is picked up by using the end of the mechanical arm, position and attitude of the target object grasped by the end of the mechanical arm can be determined based on the position and attitude of the end of the mechanical arm. Furthermore, the mechanical arm can return its own working state data to the detection and control system, and the detection and control system can determine whether the mechanical arm has picked up the target object based on the data returned by the mechanical arm. Exemplarily, the data returned by the mechanical arm may be state data of a pickup device or a grab device in the end of the mechanical arm, such as an air pressure value or the like.

In some embodiments, the height of the turnover box is a top height of the turnover box, and the height of the turnover box may be a predetermined value.

In some embodiments, the detection and control system may derive the height of the target object based on the data returned by the mechanical arm. It should be understood that the mechanical arm can continuously return the working state data to the detection and control system, so that the detection and control system can continuously obtain the height of the target at the current time.

In some embodiments, the detection and control system can determine whether the height of the target object at the current time is greater than the height of any one of the turnover boxes. When the height of the target object at the current time is less than or equal to the height of the turnover box, the target tracking process is not started, and the height of the target object at the next time is continuously acquired. When the height of the target is greater than the height of the turnover box at the current time, the target tracking process can be started.

With regard to the implementation of performing the target tracking on the target object, in an example, with reference to FIG. 3, the target object can be captured by using the image capturing device, thereby realizing the tracking of the target object.

In some embodiments, the detection and control system can control the image capturing device to capture the target object when determining that the mechanical arm picks up the target object from any turnover box and the height of the target object is greater than the height of the turnover box, and the image capturing device can transmit the captured image to the detection and control system. The detection and control system can identify the target object based on a detection algorithm of deep learning, and then target the target object during the later target tracking.

With regard to the implementation of performing the target tracking on the target object, in another example, the target object can be captured in other manners, so as to achieve the tracking of the target object. For example, laser positioning can be used to track the target object.

In some embodiments, the real-time position information of the target object can be the position coordinate information of the target object in the camera coordinate system. The camera coordinate system represents a three-dimensional rectangular coordinate system established with a focus center of the image capturing device as an origin and an optical axis of the image capturing device as Z axis. X axis and Y axis of the camera coordinate system are two mutually perpendicular coordinate axes of an image plane.

At an operation 402, when it is determined, based on the real-time position information of the target object, that the target object falls down from the mechanical arm, an area where a landing point of the target object is located is determined based on position information of the target object at current time and area position information.

In some embodiments of the present disclosure, the mechanical arm can move the target object from above the source turnover box to above the destination turnover box, and then control the end to release the target object so that the target object falls into the destination turnover box. The detection and control system can determine whether the target object falls down from the mechanical arm based on the position information of the target object obtained continuously for several times. If it is determined that the target object has not fallen from the mechanical arm, the real-time position information of the target object is continuously acquired. If it is determined that the target object has fallen from the mechanical arm, the area where the landing point of the target object is located is determined based on the position information of the target object at the current time and the predetermined area position information.

In the embodiment of the present disclosure, the area position information includes areas where various types of turnover boxes are located, and the type of the turnover box can be the source turnover box and the destination turnover box. Exemplarily, the area position information may also include other areas.

In practical applications, operations 401 to 402 may be performed based on a processor of the detection and control system. The processor may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor.

It can be understood that, according to the embodiment of the present disclosure, the photoelectric through-beam sensor, the light curtain or the grating sensor does not need to be disposed, and the landing point of the target object does not need to be estimated based on the motion model of the mechanical arm system, thereby reducing the possibility of missing detection and improving the reliability of the target object detection, compared with the detection method based on photoelectric sensors in the related art. Compared with the detection method based on the motion model in related art, the possibility of wrong detection is reduced and the accuracy of target object detection is improved because the landing point is estimated without using the motion model of mechanical arm system. Further, according to the embodiment of the present disclosure, the target tracking is performed on the target object when it is determined that the height of the target object is greater than the height of any one of the turnover boxes. That is to say, the target tracking is performed on an area above the turnover box, rather than an area within the turnover box, thus reducing the possibility of visual blind area to a certain extent, and eliminating the need to detect multiple identical target objects within the turnover box, thereby improving the accuracy and reliability of detecting the landing point of target object.

Further, according to the embodiment of the present disclosure, the photoelectric through-beam sensor, the light curtain or the grating sensor does not need to be disposed and a field working environment does not need to be transformed. That is to say, there are low requirements on the field working environment, which reduces the implementation cost to a certain extent. In addition, the technical solution of the embodiment of the present disclosure is easy to be implemented. Based on the technical solution of the embodiment of the present disclosure, the efficiency of sorting items by the mechanical arm can be improved by optimize methods for target object detection on the basis of the existing detection and control system.

With regard to the implementation of determining the height of the target object, exemplarily, after determining that the mechanical arm picks up the target object from the turnover box, an initial position of the target object is determined based on position and attitude information of the end of the mechanical arm; and the height of the target object is determined based on the initial position of the target object.

In some embodiments, the target tracking is performed on the target object based on the initial position of the target object, to obtain the real-time position information of the target object.

After the initial position of the target object is determined, an initial area of the target object is determined based on the initial position of the target object, thereby the target tracking process is started in combination with the initial area of the target object.

It can be understood that, after positioning the initial position of the target object through the position and attitude information of the end of the mechanical arm, the initial area of the target object can be located. Furthermore, in an initial stage of the target tracking, the area to be identified during the target tracking can be reduced by combining the position and attitude information of the end of the mechanical arm, and thus achieving a rapid positioning of the target object in the initial stage of the target tracking.

With regard to the implementation of tracking the target object, in some embodiments, the image capturing device can be used to capture the target object several times to obtain multiple captured images, and the target object is tracked based on each of the multiple captured images.

In the embodiment of the present disclosure, after obtaining multiple captured images, the target object in the multiple captured images can be tracked based on a detection and recognition algorithm of deep learning, thereby obtaining real-time position information of the target object.

It can be understood that, according to the embodiment of the present disclosure, when it is determined that the height of the target object is greater than the height of any one of the turnover boxes, the target object is captured so as to track the target object. That is to say, the capturing is performed based on the area above the turnover box, but the area within the turnover box is not captured, so that the possibility of visual blind area is reduced to a certain extent, and the accuracy and reliability of detecting a landing point of the target object are improved.

With regard to the implementation of performing the target tracking on the target object based on each of the multiple captured images, in some embodiments, a background in each of the multiple captured images can be eliminated to obtain a respective result after background elimination of the captured image, and the target tracking is performed on the target object based on the respective result after background elimination of the captured image. A background of the target object represents an image of a preset background object.

In the embodiment of the present disclosure, after obtaining the captured image, the background in the captured image can be obtained by dividing a foreground and the background of the captured image. Exemplarily, a neural network for distinguishing the foreground from the background may be trained in advance, and then the captured image is processed based on the trained neural network to obtain the background in the captured image.

It should be understood that, when the height of the target object is greater than the height of the turnover box, the background of the target object is usually relatively simple. At this time, a method for eliminating the background can be used for filtering out the background, so as to accurately detect and track the target object, improve the accuracy of subsequent tracking and detection, and accurately obtain the detected landing point of the target object.

In some embodiments, the mechanical arm station occupies a small area, and the background object can be preset based on the actual needs. For example, the preset background object is a solid color background material, which is beneficial to eliminate the background in each captured image.

In some embodiments, the material of the predetermined background object may be a cloth or other material, and this is not limited by embodiments of the present disclosure.

In some embodiments, after determining the area where the landing point of the target object is located, a position of the landing point of the target object is determined based on a relative position relationship between the image capturing device and the mechanical arm, and the position and attitude information of the end of the mechanical arm.

In an embodiment of the present disclosure, it is not only necessary to determine the area where the landing point of the target object is located, but also to obtain accurate coordinates of the landing point of the target object, and the relative position relationship between the image capturing device and the mechanical arm can be calibrated to obtain an area relationship with a mechanical arm-based coordinate system as a reference. Then, accurate position coordinates of the landing point of the target object can be obtained through coordinate transformation. The mechanical arm-based coordinate system can represent a coordinate system with the base of the mechanical arm as the origin.

It can be understood that, according to the embodiment of the present disclosure, an accurate position of the landing point of the target object can be obtained based on the relative position relationship between the image capturing device and the mechanical arm and the position and attitude information of the end of the mechanical arm.

In the related art, areas of a sorting scene can be labeled to determine an area where the landing point of the target object is located. However, in the actual scenario, the quantity and position of the source turnover boxes and the destination turnover boxes can change based on the order, and for the same position, the position meaning changes due to the placement of different turnover boxes. In the related art, when detecting the landing point of the target object, the detected areas cannot be dynamically increased, decreased or adjusted, which is not conducive to dynamically determining the area where the landing point of the target object is located.

In some embodiments of the present disclosure, for each turnover box of multiple turnover boxes, a type of the turnover box is determined based on an attribute of the turnover box; type labeling information of the turnover box is obtained based on the type of the turnover box. The area position information is obtained based on type labeling information of all of the multiple turnover boxes.

In some embodiments, the attribute of the turnover box includes at least one of: color, texture, shape, or size.

In the embodiment of the present disclosure, when different types of turnover boxes have different attributes, point cloud data can be obtained based on RGB image captured every time. Based on the point cloud data corresponding to RGB image captured every time, the attribute of the turnover box is identified, so as to identify a type of the turnover box. In an example, different types of the turnover boxes have different colors. In this case, contour information of the turnover box can be calculated based on the point cloud data of the turnover box. Then, the contour information can be point mapped onto the RGB image to obtain the RGB image information of the turnover box. Based on the RGB image information of the turnover box, the color of the turnover box can be determined, so that the type of the turnover box can be identified. In another example, different types of turnover boxes have different shapes. For example, the shape of the source turnover box is rectangular and the shape of the destination turnover box is rectangular. In this case, shape information of the turnover box can be determined based on the contour information of the turnover box, so as to identify the type of the turnover box.

After obtaining the type of each turnover box, the type of each turnover box can be labeled in the image, and then, combined with the position of each turnover box, areas where various types of turnover boxes are located are determined, that is, the area position information can be determined.

It can be understood that, according to the embodiment of the present disclosure, the turnover box is detected in real time based on the captured images. In this way, the source turnover box and the destination turnover box are dynamically distinguished, which is beneficial to distinguish the turnover box from the other areas, achieve the purpose of dynamically labeling various types of areas, and further achieve the purpose of dynamically adjusting the number and position of turnover boxes in specific engineering application.

Figure 5:
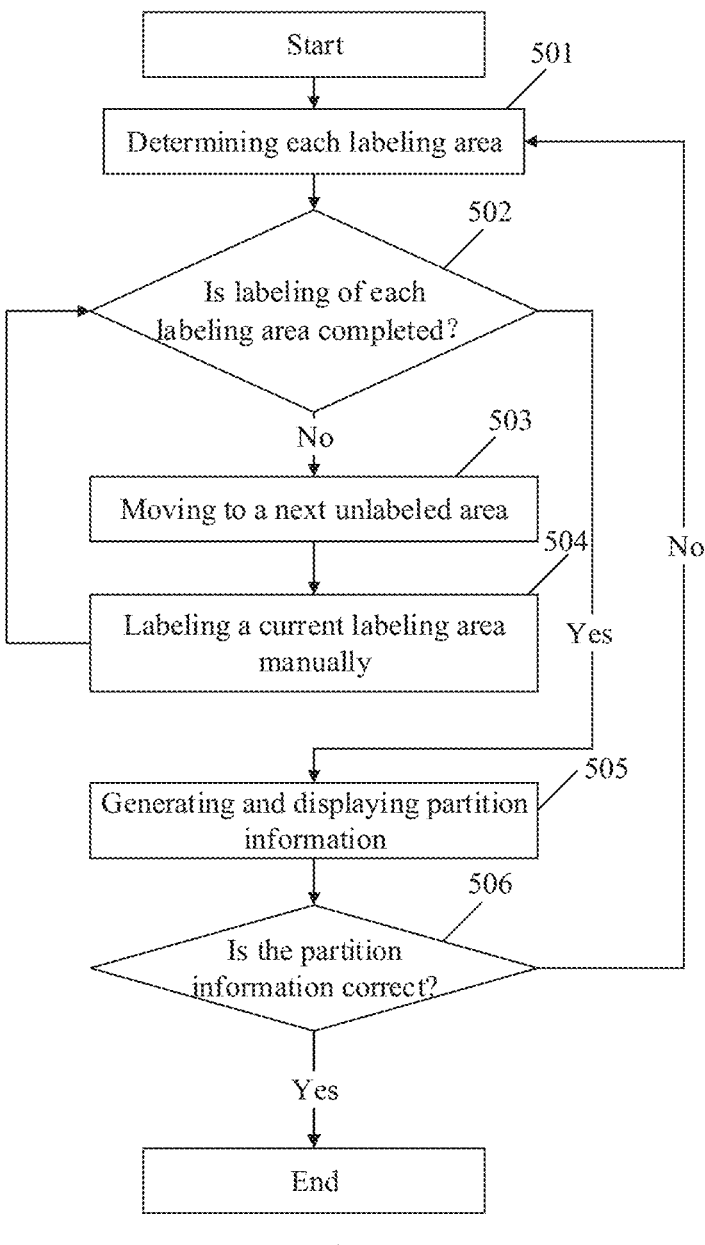
FIG. 5 illustrates an optional flowchart for manually labeling areas in an embodiment of the present disclosure.

In some embodiments, each area of the sorting scene may also be manually labeled. FIG. 5 illustrates an optional flowchart for manually labeling the areas in an embodiment of the present disclosure. As illustrated in FIG. 5, the process may include the following operations.

At an operation 501, each labeling area is determined.

In some embodiments, multiple labeling areas can be divided in the image of the sorting scene, and labeling and calibration can be started in a preset order for each labeling area. After identifying each of the areas, an operation 502 may be performed.

In other embodiments, the point cloud data of the sorting scene can be obtained by using a 3D camera, and then the obtained data can be filtered by using height information, so that an edge contour of the turnover box can be identified. After identifying the edge contour, each turnover box area and non-turnover box area can be determined. Each labeling area includes a respective one of turnover box areas and a respective one of non-turnover box areas, and the non-turnover box area is the other areas.

At the operation 502, it is determined whether the labeling of each labeling area is completed, if the labeling of each labeling area is completed, then proceed to an operation 505, and if the labeling of each labeling area is not completed, an operation 503 is performed.

At the operation 503, the process moves to a next unlabeled area, and then an operation 504 is performed.

At the operation 503, the process moves to a next unlabeled area in the image of the sorting scene. In some embodiments, the next unlabeled area may be highlighted.

At the operation 504, a current labeling area is manually labeled, and the process returns to the operation 502.

In some embodiments, the current labeling area may be highlighted and a selection dialog box pops up for a user to select whether the current area is in the destination turnover box, the source turnover box, or the non-turnover box area. In the pop-up selection dialog box, the operator can choose to perform the manual labeling for the current labeling area.

At an operation 505, partition information is generated and displayed.

The partition information represents labeling information of each labeling area in the image.

At an operation 506, it is determined whether the partition information is correct, if it is determined that the partition information is correct, the process is ended, and if it is determined that the partition information is not correct, the process is returned to the operation 501.

In the operation 506, the user of the operational information can determine whether the partition information is correct.

In some embodiments, after determining the area where the landing point of target object is located, it may be determined whether a sorting of the target object succeeds based on the area where the landing point of target object is located. Exemplarily, if the area where the landing point of target object is located is in the destination turnover box, it is determined that the sorting of the target object succeeds. If the area where the landing point of target object is located is in the source turnover box or the other areas, it is determined that the sorting of the target object fails.

It can be understood that, when the area where the landing point of target object is located is in the destination turnover box, it means that the target object has reached the destination exactly as required, and at this time, it can be determined that the sorting of the target object succeeds. When the area where the landing point of target object is located is in the source turnover box or the other areas, it means that the target object has not reached the destination as required, and it can be determined that the sorting of the target object fails. Thus, according to the embodiment of the present disclosure, it is beneficial to perform subsequent processing based on a sorting result of the target object, and is beneficial to improve the efficiency and the success rate of sorting.

Figure 6:
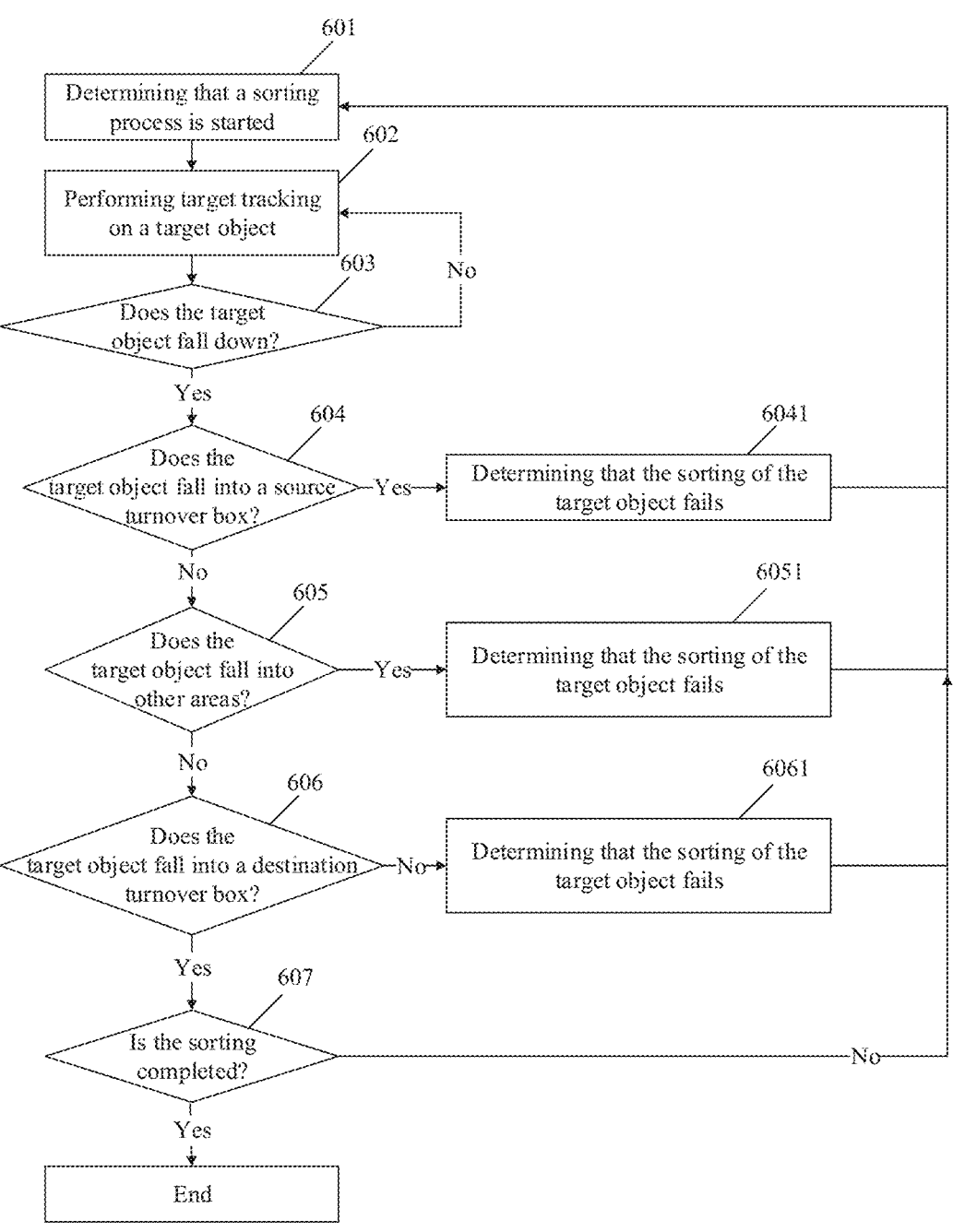
FIG. 6 illustrates another optional flowchart of a method for target object detection according to an embodiment of the present disclosure.

FIG. 6 illustrates another optional flowchart of a method for target object detection according to an embodiment of the present disclosure. As illustrated in FIG. 6, the process may include the following operations.

At an operation 601, it is determined that a sorting process is started, and then an operation 602 is performed.

At the operation 602, target tracking is performed on a target object.

The implementation of the operation 602 has been described in the foregoing embodiments and will not be repeated herein.

At an operation 603, it is determined whether or not the target object falls down. If it is determined that the target object falls down, an operation 604 is performed, and if it is determined that the target object does not fall down, the process returns to the operation 602.

The implementation of this operation has been described in the foregoing description of the embodiment and will not be repeated here.

At the operation 604, it is determined whether or not the target object falls into the source turnover box. If it is determined that the target object falls into the source turnover box, an operation 6041 is performed, and if it is determined that the target object does not fall into the source turnover box, an operation 605 is performed.

At the operation 6041, it is determined that the sorting of the target object fails, and then the process returns to the operation 601.

In some embodiments, after determining that the target object falls into the source turnover box, sorting anomaly information may be reported to the detection and control system.

At the operation 605, it is determined whether or not the target object falls into the other areas. If it is determined that the target object falls into the other areas, an operation 6051 is performed, and if it is determined that the target object does not fall into the other areas, an operation 606 is performed.

At the operation 6051, it is determined that the sorting of the target object fails, and then the process returns to the operation 601.

In some embodiments, after determining that the target object falls into the other areas, the sorting anomaly information may be reported to the detection and control system.

At the operation 606, it is determining whether or not the target object falls into the destination turnover box. If it is determined that the target object does not fall into the destination turnover box, an operation 6061 is performed, and if it is determined that the target object falls into the destination turnover box, an operation 607 is performed.

At the operation 6061, it is determined that the sorting of the target object fails, and then the process returns to operation 601.

In some embodiments, the sorting anomaly information may be reported to the detection and control system if the target object does not fall into any one of the source turnover box, the destination turnover box or the other areas.

At the operation 607, it is determined whether the sorting is completed. If it is determined that the sorting is not completed, the process returns to the operation 601, and if it is determined that the sorting is completed, the process is ended.

In the embodiment of the present disclosure, multiple target objects can be sorted based on the operations 601 to 606, and if the sorting of each target object succeeds, the process can be ended, and if there are target objects that are not unsuccessfully sorted, the operations 601 to 607 can be re-performed until each target object is successfully sorted.

It can be seen that, in combination with the processes illustrated in FIG. 5 and FIG. 6, when the source turnover box and the destination turnover box has been determined, an automatic detection of the landing point of the target object can be accomplished. Further, the success rate and efficiency of sorting can be greatly improved by interacting with the detection and control system and supplemented by the coping strategy of sorting failure.

In some application scenarios, the Warehouse Control System (WCS) can generate a mechanical arm sorting work order based on an upstream order demand, and transmit a sorting task to the detection and control system. The detection and control system will obtain relevant information of the target object. In the sorting process, the detection and control system will detect and identify the target object and perform target update until the target object falls down from the end of the mechanical arm. At this time, the detection and control system outputs area information of the landing point to complete the target tracking process.

In this application scenario, prior to the operation 601, it is possible to determine whether the pre-determined areas where various types of turnover boxes are located are correct.

Figure 7:
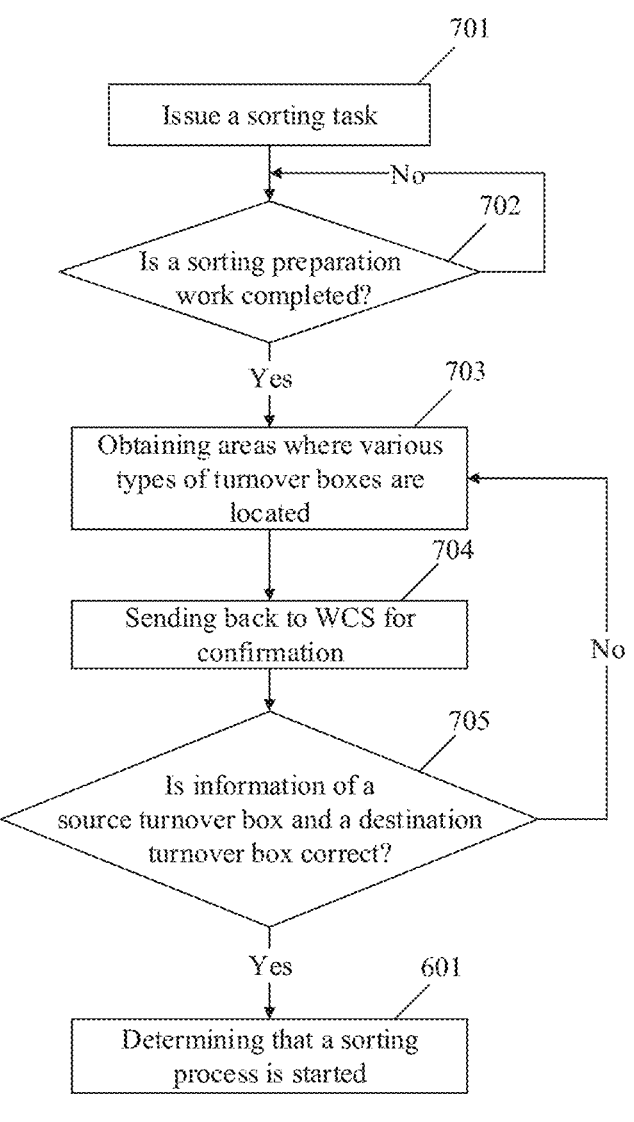
FIG. 7 illustrates a flowchart for determining whether areas where various types of turnover boxes are located are correct in an embodiment of the present disclosure.

FIG. 7 illustrates a flowchart for determining whether the areas where various types of turnover boxes are located are correct in an embodiment of the present disclosure. As illustrated in FIG. 7, the process may include the following operations.

At an operation 701, a sorting task is issued.

The WCS can issue a sorting task to the detection and control system based on the mechanical arm sorting work order, and the sorting task is used to indicate tasks for performing sorting on each target object.

At an operation 702, it is determined whether a sorting preparation work is completed. If the sorting preparation work is completed, an operation 703 is performed, and if the sorting preparation work is not completed, the operation 702 is re-performed.

The sorting preparation work may include determining whether the mechanical arm and the image capturing device are ready. If the mechanical arm and the image capturing device are ready, it is determined that the sorting preparation work is completed.

At the operation 703, the areas where various types of turnover boxes are located are obtained.

The implementation of the operation 703 has been described in the foregoing embodiments and will not be repeated herein. After obtaining the areas where various types of the turnover boxes are located, the information (including quantity and position information) of the source turnover box and the destination turnover box in the sorting scene can be determined.

At an operation 704, the information of the source turnover box and the destination turnover box is returned to WCS for confirmation.

In the operation 704, the information of the source turnover box and the destination turnover box can be transmitted to WCS. WCS has stored the information of the source turnover box and the destination turnover box in the sorting scene in advance, so that the information of the source turnover box and the destination turnover box can be confirmed.

At an operation 705, it is determined whether the information of the source turnover box and the destination turnover box is correct. If it is determined that the information of the source turnover box and the destination turnover box is correct, the operation 601 can be performed, and if it is determined that the information of the source turnover box and the destination turnover box is not correct, the process returns to the operation 703.

It can be seen that, in combination with the processes illustrated in FIG. 5, FIG. 6 and FIG. 7, under the condition that the information of the source turnover box and the destination turnover box is confirmed to be correct, the automatic detection of the landing point of the target object can be performed, and it can be applied to various sorting scenarios.

On the basis of the method for target object detection provided in the forgoing embodiment, the embodiment of the present disclosure further provides an apparatus for target object detection.

Figure 8:
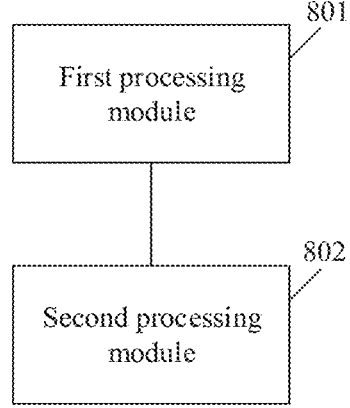
FIG. 8 illustrates a structural diagram of an apparatus for target object detection according to an embodiment of the present disclosure.

FIG. 8 illustrates a structural diagram of an apparatus for target object detection according to an embodiment of the present disclosure. As illustrated in FIG. 8, the apparatus may include a first processing module 801 and a second processing module 802.

The first processing module 801 is configured to: when it is determined that a mechanical arm picks up a target object from any one of multiple turnover boxes and a height of the target object is greater than a height of the turnover box, perform target tracking on the target object to obtain real-time position information of the target object.

The second processing module 802 is configured to: when it is determined, based on the real-time position information of the target object, that the target object falls down from the mechanical arm, determine an area where a landing point of the target object is located based on position information of the target object at current time and area position information, the area position information includes areas where various types of turnover boxes are located.

In some embodiments of the present disclosure, the second processing module 802 is further configured to performing following operations.

For each turnover box of multiple turnover boxes, a type of the turnover box is determined based on an attribute of the turnover box; and type labeling information of the turnover box is obtained based on the type of the turnover box. The area position information is obtained based on type labeling information of all of the multiple turnover boxes.

In some embodiments of the present disclosure, the attribute of the turnover box includes at least one of: color, texture, shape, or size.

In some embodiments of the present disclosure, during performing the target tracking on the target object, the first processing module 801 is further configured to perform the following operations.

The target object is captured for multiple times by using the image capturing device to obtain multiple captured images, and the target tracking is performed on the target object based on each of the multiple captured images.

In some embodiments of the present disclosure, during performing the target tracking on the target object based on each of the multiple captured images, the first processing module 801 is further configured to perform the following operations.

A background in each of the multiple captured images is eliminated to obtain a respective result after background elimination of the captured image; and the target tracking is performed on the target object based on the respective result after background elimination of the captured image. A background of the target object represents an image of a preset background object.

In some embodiments of the present disclosure, the second processing module 802 is further configured to perform the following operations.

After determining the area where the landing point of the target object is located, a position of the landing point of the target object is determined based on a relative position relationship between the image capturing device and the mechanical arm, and position and attitude information of an end of the mechanical arm.

In some embodiments of the present disclosure, the first processing module 801 is further configured to perform the following operations.

After determining that the mechanical arm picks up the target object from the turnover box, an initial position of the target object is determined based on position and attitude information of an end of the mechanical arm; and the height of the target object is determined based on the initial position of the target object.

In some embodiments of the present disclosure, the first processing module 801 configured to perform the target tracking on the target object is configured to perform the following operations.

Based on the initial position of the target object, the target tracking is performed on the target object to obtain the real-time position information of the target object.

In some embodiments of the present disclosure, the second processing module 802 is further configured to perform the following operations.

When the area where the landing point of the target object is located is in a destination turnover box, it is determined that a sorting of the target object succeeds.

When the area where the landing point of the target object is located is in a source turnover box or another area, it is determined that the sorting of the target object fails. The another area is an area other than the destination turnover box and the source turnover box.

Each of the first processing module 801 and the second processing module 802 may be implemented by a processor located in an electronic device, and the processor is at least one of an ASIC, a DSP, a DSPD, a PLD, an FPGA, a CPU, a controller, a microcontroller, or a microprocessor.

In addition, the various functional modules in the embodiment may be integrated in one processing unit, or the individual units may be physically present separately, or two or more units may be integrated in one unit. The integrated unit can be implemented either in the form of hardware or in the form of a software function module.

The integrated unit, when implemented in the form of a software function module and not sold or used as a stand-alone product, may be stored in a computer readable storage medium. Based on such an understanding, the technical solution of the embodiment in essence, or the part that contributes to the prior art or the whole or part of the technical solution can be embodied in the form of software products. The computer software product is stored in a storage medium and includes instructions for causing a computer device (which may be a personal computer, a server, a network device, etc.) or a processor to perform all or part of the operations of the method described in the embodiment. The aforementioned storage media includes a USB disk, a removable hard disk, Read Only Memory (ROM), Random Access Memory (RAM), a magnetic disk or an optical disk and other media capable of storing program codes.

Specifically, computer program instructions corresponding to the method for target object detection in the embodiment can be stored in a storage medium such as an optical disk, a hard disk or a USB disk. When the computer program instructions corresponding to the method for target object detection in the storage medium are read or executed by an electronic device, any one of methods for target object detection according to the foregoing embodiments is implemented.

Accordingly, an embodiment of the present disclosure further provide a computer program product including a non-transitory computer-readable storage medium storing a computer program that causes a computer to perform part or all of the operations of any one of the methods for target object detection according to the foregoing embodiments.

Figure 9:
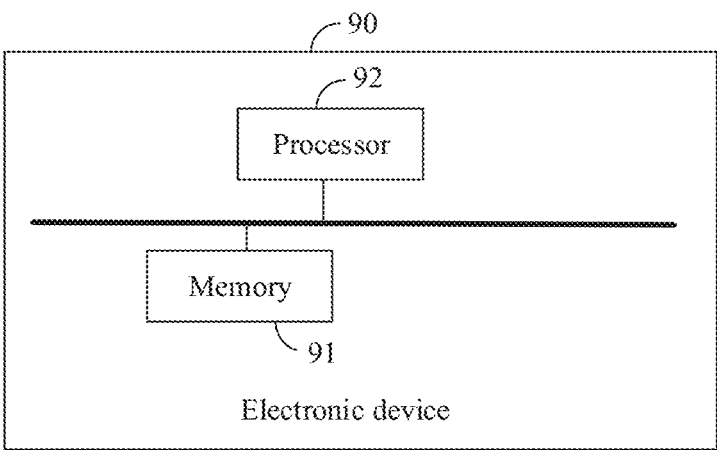
FIG. 9 illustrates a structural diagram of an electronic device according to an embodiment of the present disclosure.

Based on the same technical concept of the previous embodiments, with reference to FIG. 9, an electronic device 90 provided by an embodiment of the present disclosure may include a memory 91, a processor 92, and a computer program stored in the memory 91 and executable by the processor 92.

The memory 91 is configured to store the computer program and data.

The processor 92 is configured to execute the computer program stored in the memory to perform any one of the methods for target object detection according to the foregoing embodiments.

In practical applications, the memory 91 may be: a volatile memory, such as RAM; a non-volatile memory, such as ROM, flash memory, Hard Disk Driver (HDD) or Solid-State Drive (SSD); or a combination of the types of memories described above, and the memory 91 provides the instructions and data to the processor 92.

The processor 92 may be at least one of an ASIC, a DSP, a DSPD, a PLD, an FPGA, a CPU, a controller, a micro-controller, or a microprocessor.

In some embodiments, the apparatus provided by the embodiments of the present disclosure has functions or includes modules that may be used to perform the method described above in the method embodiments, the specific implementation of which may refer to the description of the method embodiments above, and will not be repeated here for the sake of brevity.

The above description of the various embodiments tends to emphasize the differences between the various embodiments, the same part or similarities of which may be referred to each other, and will not be repeated herein for the sake of brevity.

The methods disclosed in various method embodiments provided in the present disclosure can be arbitrarily combined without conflict to obtain a new method embodiment.

The features disclosed in various product embodiments provided in the present disclosure can be arbitrarily combined without conflict to obtain a new product embodiment.

The features disclosed in various method or device embodiments provided in the present disclosure can be arbitrarily combined without conflict to obtain a new method embodiment or device embodiment.

From the above description of the embodiments, it will be clear to those skilled in the art that the methods of the above embodiments can be implemented by means of software plus the necessary common hardware platform, and of course also by means of hardware, but in many cases the former is a preferred implementation manner. Based on such an understanding, the technical solution of the present disclosure, in essence or the part that contributes to the prior art, can be embodied in the form of software products, which is stored in a storage medium (e.g. ROM/RAM, magnetic disk, optical disk) and includes instructions for causing a terminal (which may be a mobile phone, a computer, a server, an air conditioner, or a network device, etc.) to perform the methods described in various embodiments of the present disclosure.

Embodiments of the present disclosure are described above in conjunction with the accompanying drawings. However, the present disclosure is not limited to the specific embodiments described above. The embodiment described above is merely illustrative and not limiting, and may be made in many forms by those of ordinary skill in the art with reference to the present disclosure, without departing from the scope of protection of the object and claims of the present disclosure, all of which fall within the protection of the present disclosure.

The invention claimed is:

1. A method for target object detection, performed by an electronic device, the method comprising:

in response to determining that a mechanical arm picks up a target object from any one of a plurality of turnover boxes and a height of the target object is greater than a height of the turnover box, performing target tracking on the target object to obtain real-time position information of the target object; and in response to determining, based on the real-time position information of the target object, that the target object falls down from the mechanical arm, determining an area where a landing point of the target object is located based on current position information of the target object and area position information, wherein the area position information comprises information of areas where the plurality of turnover boxes are located, the method further comprising:

when the area where the landing point of the target object is located is in a destination turnover box, determining that a sorting of the target object succeeds; and when the area where the landing point of the target object is located is in a source turnover box or another area, determining that the sorting of the target object fails, wherein the another area is an area other than the destination turnover box and the source turnover box.

2. The method of claim 1, further comprising:

for each turnover box of the plurality of turnover boxes, determining a type of the turnover box based on an attribute of the turnover box, and obtaining type labeling information of the turnover box based on the type of the turnover box; and obtaining the area position information based on type labeling information of all of the plurality of turnover boxes.

3. The method of claim 2, wherein the attribute of the turnover box comprises at least one of: color, texture, shape, or size.

4. The method of claim 1, wherein performing the target tracking on the target object comprises:

capturing, by using an image capturing device, the target object for multiple times to obtain a plurality of captured images; and performing the target tracking on the target object based on each of the plurality of captured images.

5. The method of claim 4, wherein performing the target tracking on the target object based on each of the plurality of captured images comprises:

eliminating a background in each of the plurality of captured images to obtain a respective result after background elimination of the captured image; and performing the target tracking on the target object based on the respective result after background elimination of the captured image, wherein a background of the target object represents an image of a preset background object.

6. The method of claim 4, further comprising:

after determining the area where the landing point of the target object is located, determining a position of the landing point of the target object based on a relative position relationship between the image capturing device and the mechanical arm, and position and attitude information of an end of the mechanical arm.

7. The method of claim 1, further comprising: after determining that the mechanical arm picks up the target object from the turnover box, determining an initial position of the target object based on position and attitude information of an end of the mechanical arm; and determining the height of the target object based on the initial position of the target object.

8. The method of claim 7, wherein performing the target tracking on the target object comprises:

performing, based on the initial position of the target object, the target tracking on the target object, to obtain the real-time position information of the target object.

9. An electronic device for target object detection, comprising:

a processor; and a memory storing instructions executable by the processor, wherein the processor is configured to:

in response to determining that a mechanical arm picks up a target object from any one of a plurality of turnover boxes and a height of the target object is greater than a height of the turnover box, perform target tracking on the target object to obtain real-time position information of the target object; and in response to determining, based on the real-time position information of the target object, that the target object falls down from the mechanical arm, determine an area where a landing point of the target object is located based on current position information of the target object and area position information, wherein the area position information comprises information of areas where the plurality of turnover boxes are located, and wherein the processor is further configured to:

when the area where the landing point of the target object is located is in a destination turnover box, determine that a sorting of the target object succeeds; and when the area where the landing point of the target object is located is in a source turnover box or another area, determine that the sorting of the target object fails, wherein the another area is an area other than the destination turnover box and the source turnover box.

10. The electronic device of claim 9, wherein the processor is further configured to:

for each turnover box of the plurality of turnover boxes, determine a type of the turnover box based on an attribute of the turnover box, and obtain type labeling information of the turnover box based on the type of the turnover box; and obtain the area position information based on type labeling information of all of the plurality of turnover boxes.

11. The electronic device of claim 10, wherein the attribute of the turnover box comprises at least one of: color, texture, shape, or size.

12. The electronic device of claim 9, wherein during performing the target tracking on the target object, the processor is further configured to:

capture, by using an image capturing device, the target object for multiple times to obtain a plurality of captured images; and perform the target tracking on the target object based on each of the plurality of captured images.

13. The electronic device of claim 12, wherein during performing the target tracking on the target object based on each of the plurality of captured images, the processor is further configured to:

eliminate a background in each of the plurality of captured images to obtain a respective result after background elimination of the captured image; and perform the target tracking on the target object based on the respective result after background elimination of the captured image, wherein a background of the target object represents an image of a preset background object.

14. The electronic device of claim 12, wherein the processor is further configured to:

after determining the area where the landing point of the target object is located, determine a position of the landing point of the target object based on a relative position relationship between the image capturing device and the mechanical arm, and position and attitude information of an end of the mechanical arm.

15. The electronic device of claim 9, wherein the processor is further configured to: after determining that the mechanical arm picks up the target object from the turnover box, determine an initial position of the target object based on position and attitude information of an end of the mechanical arm; and determine the height of the target object based on the initial position of the target object.

16. The electronic device of claim 15, wherein during performing the target tracking on the target object, the processor is further configured to:

perform, based on the initial position of the target object, the target tracking on the target object, to obtain the real-time position information of the target object.

17. A non-transitory computer-readable storage medium having stored thereon a computer program, which, when executed by a processor, causes the processor to perform operations comprising:

in response to determining that a mechanical arm picks up a target object from any one of a plurality of turnover boxes and a height of the target object is greater than a height of the turnover box, performing target tracking on the target object to obtain real-time position information of the target object;

in response to determining, based on the real-time position information of the target object, that the target object falls down from the mechanical arm, determining an area where a landing point of the target object is located based on current position information of the target object and area position information, wherein the area position information comprises information of areas where the plurality of turnover boxes are located, when the area where the landing point of the target object is located is in a destination turnover box, determining that a sorting of the target object succeeds; and when the area where the landing point of the target object is located is in a source turnover box or another area, determining that the sorting of the target object fails, wherein the another area is an area other than the destination turnover box and the source turnover box.

18. The non-transitory computer-readable storage medium of claim 17, wherein the processor is further configured to:

after determining the area where the landing point of the target object is located, determine a position of the landing point of the target object based on a relative position relationship between the image capturing device and the mechanical arm, and position and attitude information of an end of the mechanical arm.

\* \* \* \* \*